G. G. LOCKWOOD.
CLOD FENDER.
APPLICATION FILED JULY 23, 1917.
1,246,442. Patented Nov. 13, 1917.
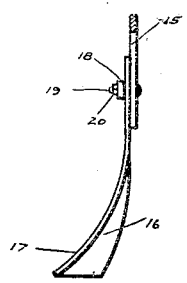
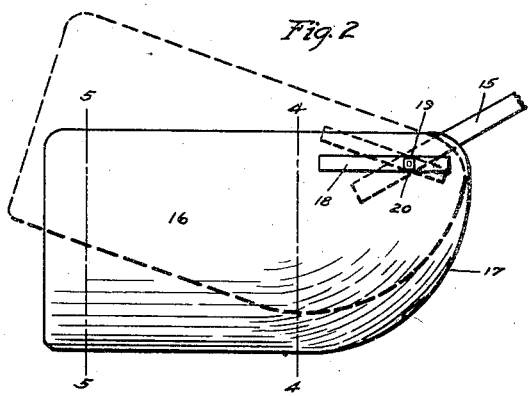
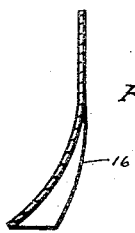
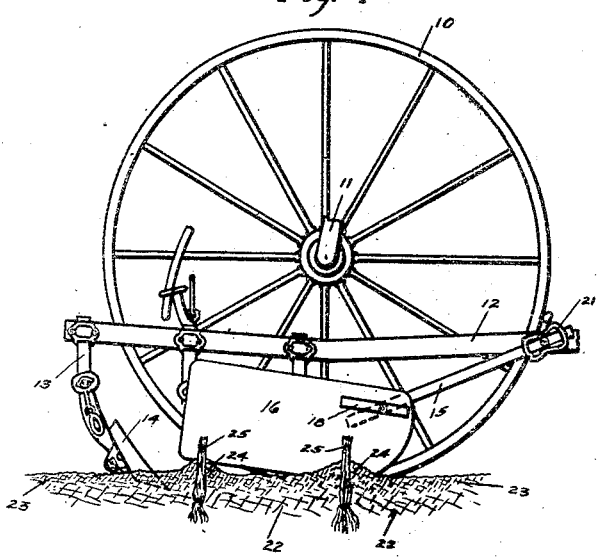

UNITED STATES PATENT OFFICE.

GEORGE GILSON LOCKWOOD, OF BAGLEY, IOWA.

CLOD-FENDER.

1,246,442.  Specification of Letters Patent.  Patented Nov. 13, 1917.

Application filed July 23, 1917. Serial No. 182,362.

*To all whom it may concern:*

Be it known that I, GEORGE GILSON LOCKWOOD, a citizen of the United States, and resident of Bagley, county of Guthrie, and State of Iowa, have invented a certain new and useful Clod-Fender, of which the following is a specification.

The object of my invention is to provide a clod fender of simple, durable and inexpensive construction.

A further object of my invention is to provide a fender adapted to be secured to a cultivator in such position that the clods turned over and stirred up by the shovels of the cultivator will not be forced over on top of the growing stalks of grain whereby the grain would be covered and destroyed.

A further object of my invention is to provide an elongated plate adapted to be secured to the frame of the cultivator and supported in such position that this plate will be interposed between the shovels and the stalks of grain as the cultivator is being driven along between the rows whereby the clods turned over by the shovels will roll against the plate and there rest instead of continuing their movement to the rows of growing grain.

A further object of my invention is to provide an elongated plate fender of this class so arranged that the small or finer dirt stirred up and rolled sidewise by the cultivator shovel may pass between the fender and the soil beneath it while the larger clods or lumps of dirt will strike against the fender and thereby be deflected rearwardly or broken up.

My invention consists in the construction, arrangement and combination of the various parts of the device whereby the objects contemplated are attained, as hereinafter more fully set forth, pointed out in my claims, and illustrated in the accompanying drawings, in which:

Figure 1 shows a side elevation of my device secured to a cultivator, only the shovel beam shaft and cultivator wheel being shown in order that the position and the attachment of my improved fender may be better illustrated.

Fig. 2 shows a side elevation of my improved fender and its supporting bar illustrating the adjustment of the fender.

Fig. 3 shows an end elevation taken from the front.

Fig. 4 shows a vertical, sectional view taken on the line 4—4 of Fig. 2, and

Fig. 5 shows a vertical, sectional view taken on the line 5—5 of Fig. 2.

Referring to the accompanying drawings I have used the reference numeral 10 to indicate generally the wheel of a cultivator in which is rotatably mounted the axle 11 to which the cultivator frame (not shown) is secured. Secured to the cultivator frame is the shovel beam 12 having attached thereto in any suitable manner shovel shanks 13 on which are mounted shovels 14. As the parts just described are all of ordinary construction and in general use no further description thereof appears necessary. Secured to the shovel beam 12 is a downwardly extending supporting bar 15, which is capable of pivotal movement relative to the shovel beam 12 at the lower rear end of the bar 15 tightly secured to my improved fender 16. The fender 16 consists of an elongated plate having its forward edge or end rounded away from the upper corner toward the lower corner to form a curved forward edge 17. The plate 16 is curved or bent in the manner shown in Figs. 3, 4 and 5. It will be seen from these figures that at the front end of the fender, there is a considerable curve as is shown in Fig. 3 and this curve lessens in curvature as it approaches the rear end of the fender as is shown by the Figs. 4 and 5.

A bar 18 is secured to the surface of the fender 16 in such position that a hole through said bar and through the fender itself is adapted to receive a bolt 19, which also extends through the bar 15 whereby tightening the nut 20 upon the bolt 19 enables the operator to hold the fender 16 from pivotal movement relative to the bar 15. The bar or brace 18 acts as a washer for the nut 20 and also acts as a brace for the fender 16.

In the practical operation of my improved cultivator fender, the fender is mounted in the position shown in Fig. 1 with its forward curved edge 17 supported in position where it will abut against the ground when the latter is at its normal level. The rear end of the fender 16 may or may not be inclined upwardly by adjusting its bolt 19 and nut 20 as may be desired from the nature of the grain which is being cultivated. With very small or young grain the rear end will be adjusted so that it will be carried very close to or upon the surface of the ground so that no lumps of any size may roll under it against the stalks of grain. If the grain is older and some of the finer dirt should roll over against the stalk the amount of dirt may be very accurately adjusted by raising or lowering the rear end of the fender. It will be seen that by means of the pivotal adjustment of the bar 15 at 21 relative to the shovel beam 12 and by means of the pivotal adjustment on the bolt 19 the fender 16 may be carried, so that its lower edge is spaced any desired distance from the ground and the edge may be turned at any desired angle to the ground. In practical operation, however, the forward end of the fender is usually carried so that it touches the normal surface of the ground and the rear end is raised from a fraction of an inch up to about six inches.

In Fig. 1 the practical effect of the cultivator on the stalks of grain has been illustrated by indicating the soil in which the grain is planted by the larger crosses 22 and the soil, which has been worked over by the finer crosses 23. The wheels, which are over adjacent to the stalks are illustrated by the numerals 24 and the stalks themselves by 25. It will be seen that as the cultivator shovel is moved forward through the soil, it causes what may be termed a wave of loosened soil, which is moved sidewise from the shovel toward the growing plants. This soil which is in the wave and moved as described consists of both fine and course dirt, which is moving in a body toward the plants. When this moving earth strikes the forward edge of the fender, it will be seen that any larger lumps, which are carried at the top of the moving earth will strike against the forward downwardly curved surface 25 by the fender, which will be at that time moving forward, so that these lumps will be wedged in between the inclined surface of the fender and the ground below and cause the lumps to be crushed into finer dirt. The effect of the forward movement of the fender also causes this wave of dirt to be deflected somewhat from its course and rolled along the side of the fender. As the dirt rolls along the side of the fender some of the finer dirt will be forced through and beneath the fender against the stalks of grain while the larger lumps will continue to roll along the fender. It will be noted, however, that the rear end of the fender is tipped or inclined upwardly so that as this wave of dirt reaches the rear end of the fender larger particles or pieces of dirt may roll therebeneath while the largest pieces will still be carried along by the fender. It will thus be seen that as the fender travels along the ground while the dirt from the shovel is rolling over against it the finer dirt will continually be permitted to pass beneath the fender toward the stalks while the larger lumps will be carried along by the fender and caused to rest between the rows of stalks.

It will also be noted that the curved shape of the fender plate has two effects in that it tends to compress the dirt rolled against it whereby the weaker of the dirt lumps may be pulverized or broken up and whereby the finer dirt is also forced beneath the edge of the fender. A further effect of this construction is that the finest of the dirt is first forced beneath the fender whereby this dirt is first brought against the stalks of grain while the coarser dirt is moved over against the stalks afterward. It will also be noted that the amount of and quality of dirt, which reaches the stalks may be adjusted to a very fine degree by means of the double pivotal mounting of the fender.

I claim as my invention:

1. In a fender, an elongated plate curved in cross section and having a greater degree of curvature at its forward end than at its rearward end, said plate having its forward edge inclined from its upper portion downwardly and rearwardly, and means for mounting said plate upon a cultivator frame to be between the shovels and the growing grain with the concave surface adjacent to the grain, said means being adapted to permit the fender plate to be adjusted vertically and tilted longitudinally.

2. In a fender, an elongated plate curved in cross section and having a greater degree of curvature at its forward end than at its rearward end, and means for mounting said plate upon a cultivator frame between the shovels and the growing grain with the concave surface adjacent to the grain, said means being adapted to permit the fender plate to be adjusted vertically and tilted longitudinally.

Des Moines, Iowa, July 14, 1917.

GEORGE GILSON LOCKWOOD.

Copies of this patent may be obtained for five cents each, by addressing the "Commissioner of Patents, Washington, D. C."